United States Patent [19]
Specht

[11] 3,712,587
[45] Jan. 23, 1973

[54] FLOW RESTRICTING VALVE

[75] Inventor: Glenn E. Specht, Charlestown, W. Va.

[73] Assignee: American LaFrance Inc., Willoughby, Ohio

[22] Filed: May 12, 1971

[21] Appl. No.: 142,549

[52] U.S. Cl. .................251/285, 137/68, 137/556.6
[51] Int. Cl. ..........................F16k 51/00, F16k 17/14
[58] Field of Search ........251/285, 288; 137/68, 553, 137/556.6, 558

[56] References Cited

UNITED STATES PATENTS 1,936,301  11/1933  Hansen et al. .....................251/285 X
3,361,148  1/1968  Turek..............................137/68

*Primary Examiner*—Henry T. Klinksiek
*Attorney*—Webster B. Harpman

[57] ABSTRACT

A flow restricting valve having a valve seat and a movable valve element and means for moving the valve element toward and away from the valve seat. A device on said means for moving the valve element engageable with a collar on said flow restricting valve acting to limit the movement of said means for moving the valve element and wherein one edge of said collar is formed in a spiral engageable with an abutment on said flow stricting valve whereby the relative positioning of the collar is determined by its engagement with said abutment.

6 Claims, 1 Drawing Figure

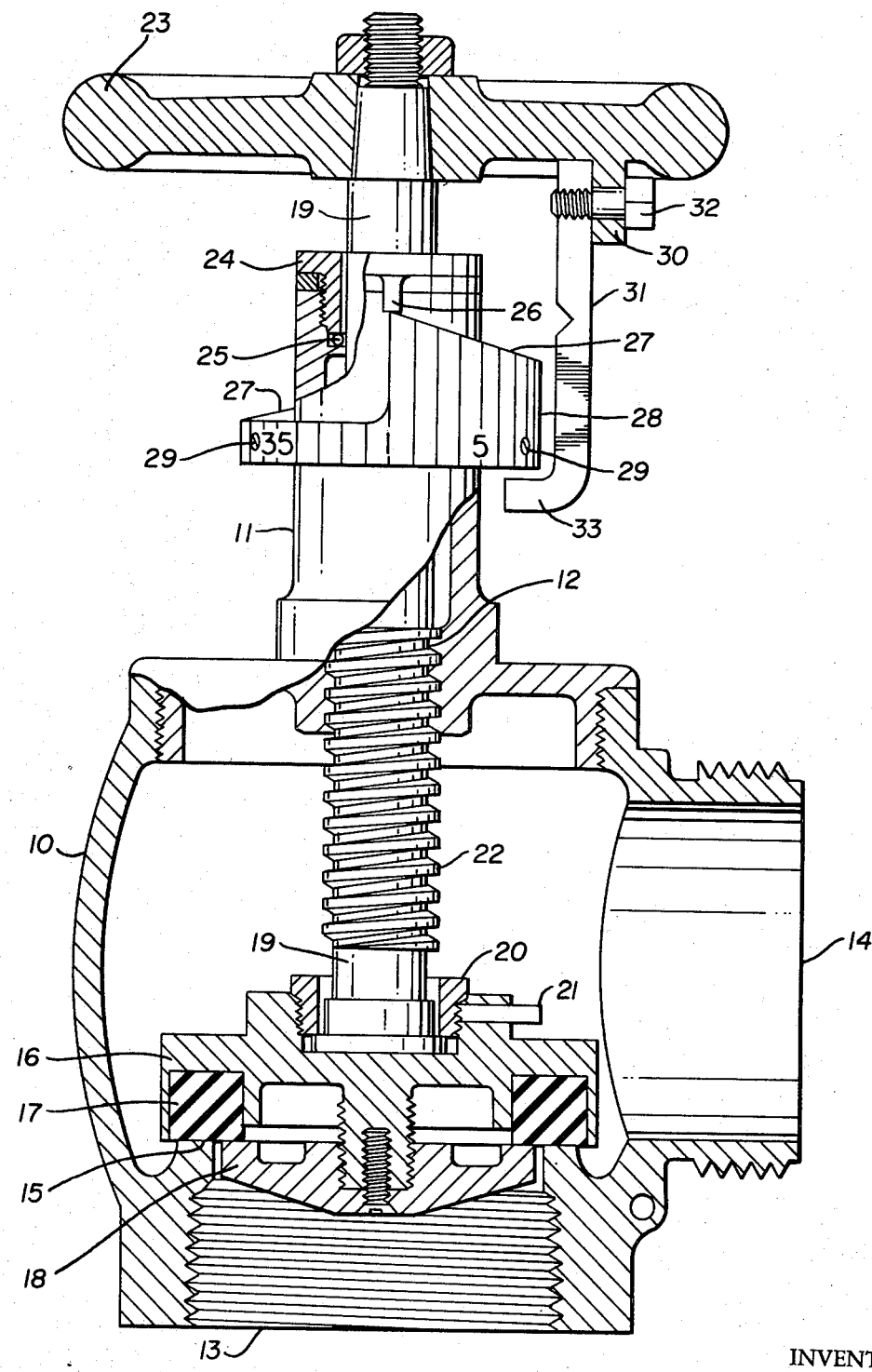
PATENTED JAN 23 1973
3,712,587
INVENTOR.
GLENN E. SPECHT
BY
W. B. Harpman
ATTORNEY

FLOW RESTRICTING VALVE

BACKGROUND OF THE INVENTION

1. Field of the Invention This invention relates to flow restricting valves such as used to control the flow of fluids through tubular members such as pipes and the like and wherein the degree of opening of a valve element relative to a valve seat is variable.

2. Description of the Prior Art

Prior structures of this type usually employ valve elements movable relative to fixed valve seats and proposals have been made to form means for restricting the movement of the valve element as for example in U.S. Pat. No. 2,497,635 wherein a handle on the valve is provided with a depending finger which acts as a stop and thereby restricts the degree of opening of the valve element. A similar arrangement is found in U.S. Pat. No. 1,936,301 wherein a depending vertical bar is provided with weak end portion to make the same breakable under strain, the bar is arranged to engage one of a pair of collars on the valve. Rotation of the handle and the bar will rotate one of the collars within the limits permitted by the other and thereby limit the opening of the valve.

In U.S. Pat. No. 3,361,148 a valve is provided with a collar and the handle has a vertically positioned pin which registers with the collar to limit the operation of the valve.

This invention eliminates the uncertainties inherent in the operation of the structures of the prior art patents and provides an easier, quicker more positive means of determining and setting the structure to the desired flow restriction.

SUMMARY OF THE INVENTION

A flow restricting valve having an inlet and outlet passageway with a valve seat therein and a valve element movable into and out of registry with said valve seat and means for moving said valve element.

A collar is rotatably mounted on the valve body and a member on the means for moving the valve element is movable into engagement with the collar so as to limit the motion of the means for moving the valve element. The collar is revolvable and has a spiral configuration registrable with an abutment on the valve body so that rotating the collar determines the position thereof and therefore the point of engagement of the motion restricting means so that the movement of the valve element is restricted accordingly.

DESCRIPTION OF THE DRAWINGS

The FIGURE is a side elevation with parts broken away and parts in cross section.

DESCRIPTION OF THE PREFERRED EMBODIMENT

In its simplest form the flow restricting valve of this invention comprises a valve body 10 having a bonnet 11 threadably engaged in the upper end thereof and defining a axial passageway, a portion of which is internally threaded as at 12. The body 10 has an inlet opening 13 in the lower portion thereof and an outlet 14 in one side thereof.

A valve seat 15 is formed inwardly of the inlet opening 13. A valve element 16 is provided with an annular seal 17 which is registrable with the valve seat 15 so as to close the inlet opening 13. The seal 17 is normally retained in the valve element 16 by a plate 18 which is fastened to the valve element 16.

A valve stem 19 having an enlarged lower end portion is secured in the upper central portion of the valve element 16 by a stem lock nut 20 and a pin 21 is positioned through a portion of the valve element 16 so as to hold the stem lock nut 20 in desired position. An external thread 22 on the stem 19 engages the internal thread 12 in the bonnet 11 so that rotary motion imparted the upper end of the stem 19 as by a hand wheel 23 engaged on a squared portion of the stem 19 will cause the valve element 16 to move toward and away from the valve seat 15.

The bonnet 11 has a packing nut 24 threadably engaged in its upper end in connection with a seal 25 and a stop washer with a projecting lug 26 thereon so as to register with the upper spiraled edge configuration 27 of a collar 28 which is positioned on the bonnet 11 and secured thereto in predetermined position by set screws 29. The hand wheel 23 has an apertured depending bracket 30 to which a frangible arm 31 is attached by a fastener 32. The lower end of the arm 31 is flanged as at 33 to underlie the collar 28.

When the valve element 16 and its annular seal 17 are in closed relation with respect to the valve seat 15, the stem 19 and the hand wheel 23 will be positioned inwardly of the body 10 and bonnet 11 of the valve and the flange 33 on the frangible arm 31 will be spaced with respect to the lower surface of the collar 28, all as illustrated in the drawing.

When the hand wheel 23 is rotated so as to revolve the stem 19 and move the valve element 16 away from the valve seat 15, the flange 33 on the frangible arm 31 will move upwardly toward the bottom of the collar 28 and that when it engages the same, further movement of the valve element 16 will be impossible unless the frangible arm 31 is broken.

By by setting the position of the collar 28 relative to the bonnet 11 the degree of opening of the flow restricting valve can be readily determined. The formation of the uppermost surface of the collar 28 in a spiral configuration 27 engageable with a projecting lug 26 makes it possible to rotate the collar 28 once the set screws 29 are loosened whereupon, by maintaining contact with the projecting lug 26, a different relative position of the bottom of the collar 28 relative to the bonnet 11 may be obtained. Indicia may accordingly be formed circumferentially of the collar 28 so that the collar can be readily set to a predetermined known indicia indicating a predetermined known degree of opening of the valve element 16 with respect to the valve seat 15.

It will thus be seen that a flow restricting valve has been disclosed which may be very easily and quickly set to a desired maximum opening and hence a desirable flow restriction and that the valve upon being opened manually will stop at that setting and that if for some reason it is desired to override the setting and its control, the frangible arm 31 is breakable so that the valve may be fully opened if so desired.

Although but one embodiment of the present invention has been illustrated and described it will be apparent to those skilled in the art that various changes and modifications may be made therein without departing from the spirit of the invention and having thus described my invention,

What I claim is:

1. In a flow restricting valve having a body with inlet and outlet openings and a valve seat therebetween, a movable valve stem carried by said body, a valve element on said valve stem registrable with said valve seat and movable toward and away from said valve seat by said valve stem; means for limiting the movement of said valve stem to restrict the movement of said valve element relative to said valve seat, said means comprising a collar on said valve body having an uppermost annular surface, said collar having a spiral configuration on the uppermost annular surface thereof, means on said valve stem engageable with said collar to limit movement of said valve stem, means on said valve body registrable with said spiral configuration on said collar for moving said collar longitudinally of said valve body when said collar is revolved, and means normally holding said collar in adjusted position on said valve body.

2. The flow restricting valve of claim 1, wherein a bonnet is on said body, said valve stem being movable through said bonnet, said collar being on said bonnet, and said means registerable with said spiral configuration is on said bonnet.

3. The flow restricting valve of claim 2 wherein the means for holding the collar in adjusted position comprises set screws in said collar engaging said bonnet.

4. The flow restricting valve of claim 2 wherein the means on said bonnet registrable with said area of uneven length of said collar comprises a projecting lug.

5. The flow restricting valve of claim 1, wherein said means on said valve stem engageable with said collar comprises an arm.

6. The flow restricting valve of claim 5 wherein a hand wheel is positioned on said valve stem and said arm is attached to said hand wheel.

* * * * *